Dec. 13, 1960　　　E. R. BUXTON　　　2,964,269
AIRCRAFT MANEUVER STABILIZER
Filed Aug. 30, 1956
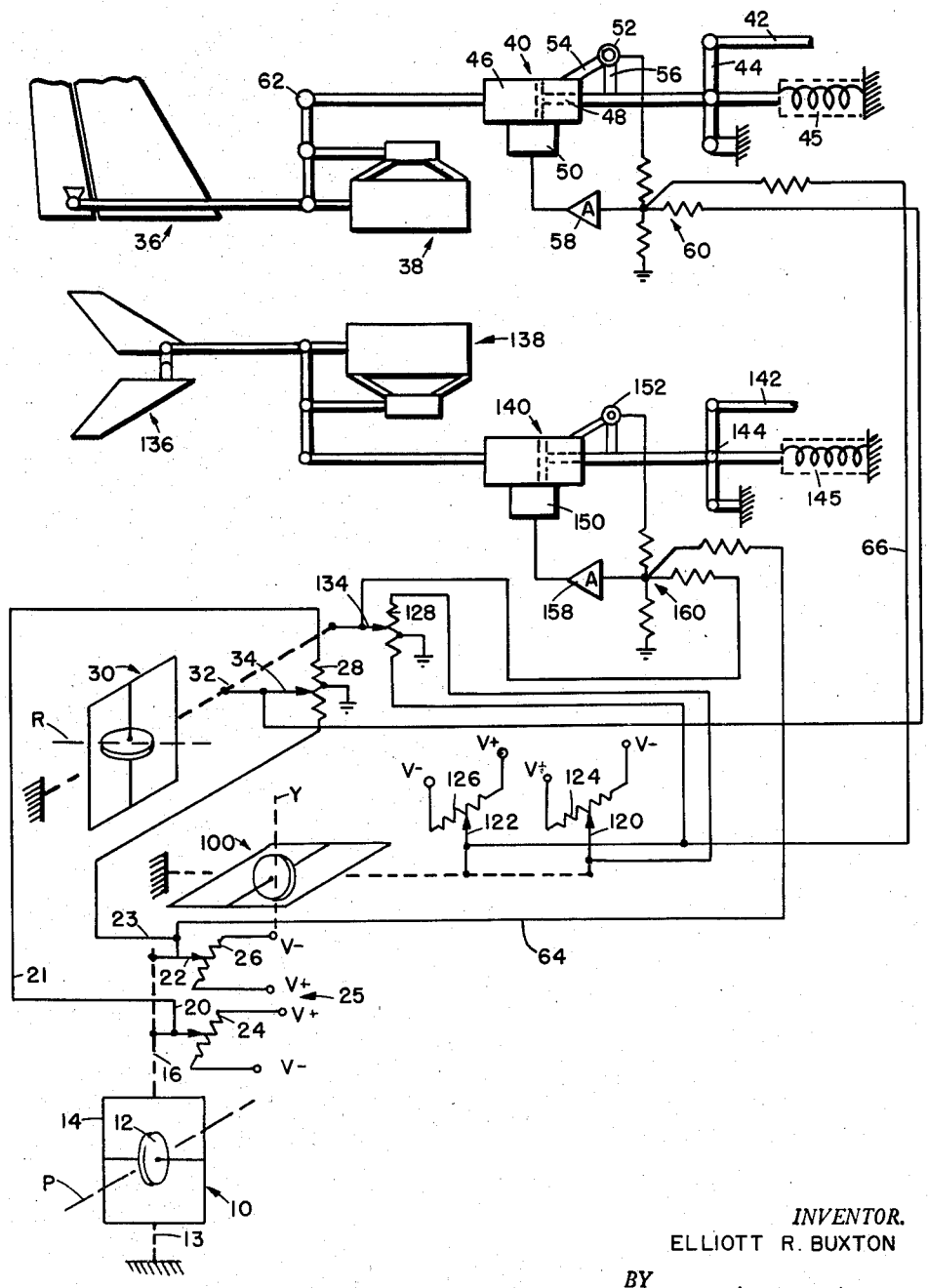
INVENTOR.
ELLIOTT R. BUXTON
BY
ATTORNEY United States Patent Office 2,964,269
Patented Dec. 13, 1960

2,964,269

AIRCRAFT MANEUVER STABILIZER

Elliott R. Buxton, Downey, Calif., assignor to North American Aviation, Inc.

Filed Aug. 30, 1956, Ser. No. 607,222

15 Claims. (Cl. 244—77)

This invention relates to automatic control equipment for high speed aircraft and more particularly to apparatus for eliminating the effects of gyroscopic upsetting moments on such aircraft during high speed maneuvers.

The trend of modern aircraft toward very long, slender fuselages of high density and high wing loadings with short span wings is creating ever more difficult stability and control problems. Such aircraft are subject to certain flight dynamical phenomena attributable to the large difference in the inertial moments of the aircraft about the roll axis, and the yaw and pitch axes. Specifically, slender, heavy, small span fighter-type aircraft during rolling maneuvers may at some flight conditions exhibit dangerous or destructive pitching and yawing transients which are induced by the inertial cross coupling of the aircraft roll, pitch and yawing motion. Furthermore, at all flight conditions this tendency of motion about one axis to cause disturbances about another axis causes more difficult target tracking, that is, it deteriorates the controllability of the aircraft. These effects could be eliminated by redistribution of the mass of the aircraft to more nearly equalize the several inertial moments. Such a solution will, however, involve nonoptimum design from the standpoint of drag, structural efficiency, and efficiency of flight in general.

The present invention introduces into the control channel of the aircraft a stabilizing signal which is of such a nature as to substantially compensate for the cross coupling effects, or gyroscopic upsetting moments, which occur at certain flight conditions. There is derived from suitable rate gyroscopes a signal which is proportional to the product of the angular velocities of the aircraft about a first and second axis, respectively. This signal is fed into the mechanism which controls the motion of the aircraft about a third axis in such a manner as to substantially cancel the adverse effects of the cross coupling moments. For stability about the yaw axis, for example, the yaw control surface, the rudder, is caused to be displaced an increment which is proportional to the product of roll rate and pitch rate while the pitch control surface is caused to be displaced an increment which is proportional to the product of roll rate and yaw rate for stability about the pitch axis.

It is an object of this invention to improve the safety of fligh and controllability of high speed aircraft without sacrifice of efficiency of flight.

Another object of this invention is the improvement of maneuverability of aircraft having an inertial moment about one axis which is smaller than inertial moments of the aircraft about two other principal axes.

A further object of this invention is the elimination of pitching and yawing transients which are induced by inertial cross coupling between pitch, roll and yaw motion of slender high-speed aircraft.

Another object of this invention is the automatic compensation for the gyroscopic upsetting moments which exist in aircraft due to the distribution of the mass thereof.

Other objects and many of the attendant advantages of this invention will be readily appreciated as the same becomes better understood by reference to the following detailed description when considered in connection with the accompanying drawing wherein the single figure schematically represents maneuver stabilizing equipment in accordance with the principles of this invention.

The mass of the supersonic aircraft in accordance with present design is distributed largely about the longitudinal or roll axis thereof, resulting in a relatively small inertial moment about the roll axis as compared to the inertial moments about the pitch and yaw axes. At high roll rates, particularly, the aircraft behaves dynamically like a gyroscope wherein the aircraft roll axis corresponds to the gyro spin axis. Torque is produced about the pitch and yaw axes due to the coupling between pitch, yaw and roll rates induced by the gyroscopic action. This inertial cross coupling may be most clearly illustrated by considering the following approximate differential equations of aircraft motion for rolling, pitching and yawing acceleration:

(1) $$\ddot{\phi} = \frac{L}{I_x} - \left(\frac{I_z - I_y}{I_x}\right)(\dot{\theta}\dot{\psi})$$

(2) $$\ddot{\theta} = \frac{M}{I_y} + \left(\frac{I_z - I_x}{I_y}\right)(\dot{\phi}\dot{\psi})$$

(3) $$\ddot{\psi} = \frac{N}{I_z} - \left(\frac{I_y - I_x}{I_z}\right)(\dot{\phi}\dot{\theta})$$

Where $\dot{\phi}$ = Roll rate.
$\dot{\theta}$ = Pitch rate.
$\dot{\psi}$ = Yaw rate.
$L$ = Aerodynamic moments about roll axis.
$M$ = Aerodynamic moments about pitch axis.
$N$ = Aerodynamic moments about yaw axis.
$I_x$ = Moment of inertia about roll axis.
$I_y$ = Moment of inertia about pitch axis.
$I_z$ = Moment of inertia about yaw axis.

The roll, pitch and yaw axes are conventionally defined as the principal axes of inertia of the aircraft.

Examination of the Equations 2 and 3 which define the pitching and yawing acceleration in terms of pitch moments, yaw moments, moments of inertia and cross coupling factors, indicates that during steady rolling, (constant $\dot{\phi}$) pitching acceleration is induced by the yaw rate $\dot{\psi}$ and yawing acceleration is induced by pitch rate $\dot{\theta}$ provided the difference terms $(I_z - I_x)$ and $(I_y - I_x)$ are not zero. For the majority of aircraft prior to the transonic and supersonic types, the moments of inertia about each of the three principal axes were substantially equal, and consequently the cross coupling terms were assumed or known to be of negligible value and not included in most engineering studies. However, for the modern high performance aircraft with which this invention is concerned, the moments of inertia about the yaw axis and about the pitch axis, $I_z$ and $I_y$, are substantially larger than the moment of inertia about the roll axis, $I_x$, whereby yawing rate and pitching rate will have substantial effects upon pitching acceleration and yawing acceleration, respectively.

The apparatus schematically depicted in the drawing provides a means whereby the adverse effects of the gyroscopic cross coupling terms are eliminated by displacing the pitch control surface an increment proportional to the second term on the right in Equation 2 and by displacing the yaw control surface an increment proportional to the second term to the right in Equation 3. This is accomplished by utilizing three rate gyros to sense, respectively, the rates of motion of the aircraft about the roll, yaw and pitch axes thereof. A signal proportional to the product of the outputs of the roll and pitch rate gyros is fed to the aircraft rudder control mechanism while a signal proportional to the product of the outputs of the roll and yaw rate gyros is fed to the mechanism which actuates the aircraft pitch control surface.

A conventional pitch rate gyro 10 having its input axis on the pitch axis P of the aircraft comprises a rotor 12 which may be rotated about its spin axis by any conventional means and is rotatably mounted in a gimbal 14 which is pivotally mounted to the fixed structure of the aircraft about an axis 16. There is provided the usual stiff pivotal gimbal restraint in the form of a torsion bar 13 included in the pivotal mounting of the gimbal. As the aircraft rotates about its pitch axis the output axis 16 of the pitch rate gyro will rotate an amount directly proportional to the rate of such pitch motion (the angular velocity of the aircraft about its pitch axis) whereby a pair of potentiometer arms 20 and 22 fixedly mounted to output axis 16 are caused to move across the resistance elements 24 and 26 of the dual potentiometer 25. Each resistance element has the opposite ends thereof connected respectively to positive and negative sources of fixed potential $+V$ and $-V$, whereby a variable voltage appears on the arms 20 and 22 of the dual potentiometer. This voltage is proportional to pitch rate and provides through leads 21 and 23 the exciting voltage for one of the potentiometers 28 of the roll rate gyro 30. The latter is substantially identical to the pitch rate gyro, except for orientation of its input axis R on the roll axis of the aircraft, and provides a mechanical output, angular motion of output shaft 32, proportional to the rate of roll of the aircraft which causes movement of the potentiometer arm 34 fixed to the output shaft 32.

The aircraft yaw control, rudder 36, is operated by rudder power servo mechanism 38 which is of well-known construction and may be, for example, of the type shown in Fig. 7.6–2, page 182 of Servo Mechanism and Regulating System Design, volume 1, by Harold Chestnut and Robert W. Mayer. As is well-known, such a power servo produces power amplification while maintaining a load displacement which is proportional to input motion. The input to the power servo is derived through an extensible link actuator 40 from pilot's rudder control linkage 42 and 44. The actuator 40 comprises a cylinder 46 and piston 48 which are controlled by an electrically operated servo valve 50. A link actuator position potentiometer 52 provides an output voltage indicative of the link actuator position by means of arms 54 and 56 which are, respectively, pivoted to the cylinder 46 and piston 48 and to the potentiometer 52 whereby relative motion of the piston and cylinder varies the potentiometer output voltage. The output of the potentiometer 52 is applied to the input of amplifier 58 through a summing network 60 and the amplifier feeds to the servo valve 50 a signal which causes the valve to effect relative motion between the cylinder 46 and piston 48 and variation of the potentiometer voltage in a direction which reduces the input voltage to the amplifier to zero. The specific details of the servo valve 50 form no part of this invention since such valves are well-known to those skilled in the art. Suitable valves are available on the market which may be utilized with the described invention in order to effect a relative motion between cylinder 46 and piston 48 which is proportional in magnitude and direction to the amplitude and polarity of the signal derived from amplifier 58. Thus, the signal derived from the roll rate potentiometer arm 34 which is proportional in polarity and magnitude to the polarity and magnitude of the product of pitch and roll rates will create an error signal at the amplifier input such that the rudder is displaced in the proper direction and in an amount sufficient to compensate for the cross coupled pitch moment. The extensible link actuator 40 is effectively in series with the manual rudder control so that the pilot retains control over the rudder position and any signal fed to the summing network 60 serves only to modulate the control of the pilot. A spring 45 is coupled between the pilot's rudder control linkage 42, 44 and fixed structure of the aircraft in order to simulate control feel for the pilot. In the absence of a signal at the input of the amplifier the extensible link assembly operates as a fixed link between the pilot's control and the rudder power servo 38.

Since the voltage across potentiometer 28 is proportional to the pitch rate as derived from the pitch rate gyro and the position of potentiometer arm 34 is proportional to the roll rate, the voltage on the arm 34 is substantially proportional to the product of pitch and roll rates. This voltage is fed as a pitch stabilizing signal to the summing network 60 where it is compared with the extensible link actuator position feedback signal from potentiometer 52. This produces a difference signal at the output of the amplifier which actuates the servo valve to cause relative extension of the piston and cylinder in such a manner as to drive the net input to the amplifier to zero. The input mechanical motion to the rudder power servo 38 at point 62 is thus the sum of the pilot's rudder pedal displacement (displacement of shaft 42) and an increment proportional to the product of roll and pitch rates.

The scaling factors, the mechanical and electrical amplification, are selected such that the total rudder displacement which is produced by the stabilizing signal from potentiometer arm 34 is substantially proportional to the product of roll and pitch rates multiplied by the difference between yaw and roll moments of inertia. This condition for both yaw and pitch channels, respectively, may be set forth mathematically as (4) $$\left(\frac{\partial M}{\partial \delta_E}\right)(\Delta \delta_E) \approx (I_z - I_x)(\dot{\psi}\dot{\phi})$$

(5) $$\left(\frac{\partial N}{\partial \delta_R}\right)(\Delta \delta_R) \approx (I_y - I_x)(\dot{\theta}\dot{\phi})$$

where $\delta_E$ is the unit elevator deflection and $\Delta \delta_E$ is the elevator deflection produced by $(\dot{\psi}\dot{\phi})$; $\delta_R$ is the unit rudder deflection and $\Delta \delta_R$ is the rudder deflection produced by $\dot{\theta}\dot{\phi}$.

The pitch stabilizing channel is structurally and functionally similar to the above described yaw stabilizing channel and comprises a yaw rate gyro 100 having its input axis on the yaw axis Y of the aircraft and effecting actuation of arms 120 and 122 of dual potentiometer 124 and 126 in accordance with the gyro's gimbal deflection. The arms 120 and 122 provide the exciting voltage for the potentiometer 128 of the roll rate gyro 30 whereby the voltage appearing on arm 134 is proportional to the product of yaw and roll rate. This voltage is compared with the voltage derived from the position potentiometer 152 of the differential link actuator 140 in mixing network 160, and the difference is amplified and injected into the actuator hydraulic control valve 150 in such a manner as to zero the error. The input mechanical motion to the pitch control surface power servo 138 is thus the sum of the pilot's pitch control displacement and an increment proportional to the product of yaw and roll rate. The manual operation of pitch control surface 136 is effected by the manual operation of control linkage 142 and 144 having the control feel spring 145 coupled thereto as explained before.

In the design of high speed aircraft which results in small areas and short effective moment arms for aerodynamic surfaces coupled with conditions of high altitude flight, the aerodynamic damping forces are substantially reduced. With the above described apparatus it is comparatively simple to provide increased damping of yawing or pitching oscillation by feeding to the rudder and elevator control, respectively, an increment which is proportional to yaw and pitch rate, respectively. This may be conveniently effected for the pitch channel by feeding the voltage from arm 22 through lead 64 to the summing network input 160 of amplifier 158 and for the yaw channel by feeding a voltage from arm 122 through lead 66 to the summing network 60 of amplifier 58.

The specific analogue mechanization described above is practical from an equipment standpoint but is intended to be an exemplary embodiment of but one of several methods which may be utilized by those skilled in the art to practice the principles of this invention.

It will be readily appreciated that the disclosed invention automatically introduces aerodynamic corrective moments which oppose the gyroscopic upsetting moments and thereby allows aircraft design for maximum flight performance. Additionally, the cancellation of the gyroscopic upsetting moments by the apparatus of this invention tends to improve the tracking or aiming abilities of the aircraft through the elimination of interference between yaw and pitch axis motions.

Obviously many modifications and variations of the present invention are possible in the light of the above teachings. It is therefore to be understood that within the scope of the appended claims the invention may be practiced otherwise than as specifically described.

I claim:

1. In combination with an aircraft having a relatively small moment of inertia about a first principal axis thereof and relatively large moments of inertia about second and third principal axes thereof, stabilizing apparatus comprising means on said aircraft for deriving a signal proportional to the product of the angular velocities of the aircraft about said first and second axes respectively, means on said aircraft for controlling the motion of said aircraft about said third axis, and means connected between said signal deriving means and said controlling means for operating said controlling means.

2. In combination with an aircraft subject to gyroscopic upsetting moments during maneuvers about a first principal axis due to an inertial moment about said first axis which is of substantially different magnitude than the inertial moments about second and third principal axes thereof respectively, means on said aircraft for generating a signal indicative of the product of the angular velocities of the aircraft about said first and second axes respectively, means on said aircraft for controlling the motion of said aircraft about said third axis, and means connected between said signal generating means and said controlling means for operating said controlling means in response to said signal.

3. The apparatus of claim 2 including means on said aircraft for generating a second signal indicative of the product of the angular velocities of the aircraft about said first and third axes respectively, means on said aircraft for controlling the motion of said aircraft about said second axis, and means connected between said last-mentioned controlling means and said second signal generating means for operating said last-mentioned controlling means.

4. In an aircraft having an inertial moment about its pitch axis which is greater than the inertial moment thereof about its roll axis, stabilizing apparatus on said aircraft comprising actuating means for controlling said aircraft about its yaw axis, position means coupled with said actuating means for generating a signal representative of the position of said actuating means, stabilizing means for generating a stabilizing signal representative of the product of the roll and pitch rates of said aircraft, and means connected between said position and stabilizing means and said actuating means for operating said actuating means in response to the difference etween said signals.

5. In an aircraft having inertial moments about its yaw and pitch axes which are substantially greater than the inertial moment thereof about its roll axis, stabilizing apparatus mounted on said aircraft comprising actuating means for controlling movement of said aircraft about the yaw and pitch axes, first and second position means coupled with said actuating means for generating position signals respetcively indicative of the positions of said yaw and pitch actuating means, first stabilizing means for generating yaw and pitch stabilizing signals respectively proportional to the product of aircraft roll and pitch rates and to the product of aircraft roll and yaw rates, means connected to be responsive to the difference between said yaw position signal and said yaw stabilizing signal for operating said yaw actuating means, and means connected to be responsive to the difference between said pitch position signal and said pitch stabilizing signal for operating said pitch actuating means.

6. In an aircraft having first, second and third principal axes, first and second rate gyroscopes carried by said aircraft having outputs respectively indicative of the rates of movement of said aircraft about said first and second axes, computing means coupled with said gyroscopes for generating a signal proportional to the product of said outputs, control means on said aircraft for controlling said aircraft about said third axis, position means coupled with said control means for generating a position signal representative of the position of said control means, means coupled with said computing and position means for combining said signals to produce an error signal, and means connected to be responsive to said error signal for actuating said control means to drive said error signal toward zero.

7. In an aircraft having inertial moments about second and third principal axes which are greater than the inertial moment thereof about a first axis, a stabilizer on said aircraft comprising in combination a first rate gyroscope having its input axis on said first axis and having an output, a second rate gyroscope having its input axis on said second axis and having an output, means connected to said second gyroscope for producing a voltage varying in accordance with the output of said second gyroscope, means connected to said first rate gyroscope for producing a voltage varying in accordance with the output of said first gyroscope, means connected with both said voltage producing means for deriving a stabilizing voltage which is substantially proportional to the product of said varying voltages, means for controlling said aircraft about said third axis, control information means coupled to said controlling means for effecting actuation thereof, and means responsive to said stabilizing voltage and coupled with said control information means for adding a stabilizing increment to said control information.

8. In an aircraft subject to gyroscopic upsetting moments about a first principal axis thereof, said moments being a function of the product of the angular velocities of said aircraft about a second and third principal axes thereof respectively, stabilizing apparatus mounted on said aircraft comprising in combination means for sensing the respective angular velocities about said second and third axes, means responsive to said sensing means for generating a signal which is proportional to said function of the product of said velocities, control means for exerting on said aircraft aerodynamic controlling moments about said first axis, and means responsive to said signal for actuating said control means to effect exertion on said aircraft of aerodynamic moments in opposition to said gyroscopic upsetting moments.

9. Apparatus for automatically stabilizing an aircraft about a first principal axis thereof comprising means on said aircraft for deriving a signal in accordance with the product of the angular velocities of the aircraft about second and third principal axes thereof respectively, and means responsive to said signal for controlling the motion of said aircraft about said first axis.

10. In an aircraft subject to gyroscopic upsetting moments during maneuvers about a first principal axis due to an inertial moment about said first axis thereof which is of substantially different magnitude than the inertial moments about second and third principal axes thereof respectively, means on said aircraft for sensing the angular velocities of said aircraft about said second and third axes respectively, means on said aircraft responsive to said sensing means for generating a signal indicative of the product of the angular velocities of the aircraft about said second and third axes respectively, and means on said aircraft at least partially responsive to said signal in predetermined proportion according to relative moments of inertia of said aircraft about said axes for controlling the motion of said aircraft about said third axis.

11. In an aircraft having an inertial moment about its yaw axis which is greater than the inertial moment thereof about its roll axis, actuating means on said aircraft for controlling said aircraft about its pitch axis, means coupled with said actuating means for generating a signal representative of the position of said actuating means, means on said aircraft for generating a stabilizing signal representative of the product of the roll and yaw rates of said aircraft, and means connected to be responsive to the difference between said signals for operating said actuating means.

12. In an aircraft having inertial moments about its yaw and pitch axes which are substantially greater than the inertial moment thereof about its roll axis, yaw and pitch actuating means each including control surfaces on said aircraft, yaw and pitch manual control elements on said aircraft, yaw and pitch extensible link assemblies respectively connected between said yaw element and said yaw actuating means and between said pitch element and said pitch actuating means for controlling movement of said aircraft about the yaw and pitch axes respectively, position means coupled with said assemblies for generating position signals respectively indicative of the positions of said yaw and pitch assemblies, stabilizing means for generating yaw and pitch stabilizing signals respectively proportional to the product of aircraft roll and pitch rates and to the product of aircraft roll and yaw rates, means connected to said position and stabilizing means and responsive to the difference between said yaw position signal and said yaw stabilizing signal for operating said yaw link assembly, and means connected to said position and stabilizing means and responsive to the difference between said pitch position signal and said pitch stabilizing signal for operating said pitch link assembly.

13. In an aircraft having first, second and third principal axes, first and second gyroscopes having outputs respectively indicative of the angular velocities of said aircraft about said first and second axes, stabilizing means coupled with said gyroscopes for generating a signal proportional to the product of said outputs, control means for exerting on said aircraft aerodynamic moments about said third axis, pilot means for piloting said aircraft, connecting means responsively coupled with said pilot means and operatively coupled with said control means for actuating said control means, said connecting means including means for modulating the effect of said pilot means on said control means, position means coupled with said modulating means for generating a position signal representative of the position of said modulating means, means coupled with said stabilizing and control means for combining said signals to produce an error signal, and means coupled with said combining means and responsive to said error signal for actuating said modulating means to vary said position signal and drive said error signal toward zero.

14. In an aircraft having inertial moments about second and third principal axes which are greater than the inertial moment thereof about a first axis, a first rate gyroscope having its input axis on said first axis and having an output, a second rate gyroscope having its input axis on said second axis and having an output, a potentiometer, means responsive to the output of said second gyroscope for producing a variable voltage across said potentiometer, means responsive to said first gyroscope and said potentiometer for deriving from said potentiometer a stabilizing voltage which is substantially proportional to the product of said variable voltage and the output of said first gyroscope, means for controlling said aircraft about said third axis, manual means for actuating said controlling means, an extensible link actuator serially coupled between said manual means and said controlling means, position sensing means on said actuator for generating a position voltage indicative of the position of said actuator, means for summing said position and stabilizing voltages to provide an error signal, and means responsive to said error signal for driving said actuator in accordance with said stabilizing voltage.

15. In apparatus for controlling the attitude of a dirigible craft having roll, pitch and yaw axes: control means for controlling the attitude of said craft about said axes; signal responsive means controlling said control means; means on said craft for sensing rate of turn of said craft about said axes; signal producing means operated by said sensing means and producing separate signals as a function of rate of turn of said craft about said axes; means multiplying said roll rate of turn signal by said pitch rate of turn signal so as to produce a resultant signal; means combining said resultant signal and said yaw rate of turn signal and applying said combined signal to said signal responsive means controlling said craft about said yaw axis, said resultant signal having a sense opposite to the sense of said yaw rate signals.

References Cited in the file of this patent
UNITED STATES PATENTS
2,196,385    De Florez et al. _____ Apr. 9, 1940